United States Patent
Siegel et al.

[11] Patent Number: 5,618,085
[45] Date of Patent: Apr. 8, 1997

[54] HYDRAULIC HOUSING BLOCK FOR HYDRAULIC BRAKE CONTROL OF VEHICLE BRAKES

[75] Inventors: Heinz Siegel, Stuttgart; Harald Ott, Ditzingen, both of Germany

[73] Assignee: Robert Bosch GmbH, Stuttgart, Germany

[21] Appl. No.: 555,632

[22] Filed: Nov. 9, 1995

[30] Foreign Application Priority Data

Nov. 10, 1994 [DE] Germany .......... 44 40 147.7

[51] Int. Cl.⁶ .............. B60T 8/42; B60T 8/48; B60K 28/16
[52] U.S. Cl. .............. 303/113.1; 303/116.4; 303/87; 303/115.1
[58] Field of Search .......... 303/113.1, 113.2, 303/113.3, 10–12, 87, 116.4, 115.1, 115.4–115.6; 277/70, 71, 72 R, 237 A, 29, 207 R, 212 F; 138/96 R, 31, 30; 188/352; 60/413; 417/540; 92/135, 182, 193; 267/170, 179; 137/568

[56] References Cited

U.S. PATENT DOCUMENTS

| | | | |
|---|---|---|---|
| 3,829,104 | 8/1974 | Green | 277/29 |
| 4,428,630 | 1/1984 | Folger et al. | 277/29 |
| 4,448,461 | 5/1984 | Otto | 277/29 |
| 4,482,160 | 11/1984 | Yanagi et al. | 277/29 |
| 4,651,782 | 3/1987 | Fulmer | 138/31 |
| 4,674,541 | 6/1987 | Fulmer | 138/31 |
| 4,674,755 | 6/1987 | Colanzi et al. | 277/23 |
| 4,693,276 | 9/1987 | Fulmer | 138/31 |
| 4,770,548 | 9/1988 | Otto | 277/29 |
| 4,819,949 | 4/1989 | Otto | 277/29 |
| 5,167,419 | 12/1992 | Robertson | 277/29 |
| 5,244,262 | 9/1993 | Kehl et al. | |
| 5,311,910 | 5/1994 | Hasegawa et al. | 138/96 R |
| 5,324,101 | 6/1994 | Kehl et al. | 303/86 |
| 5,328,178 | 7/1994 | Nies | 277/29 |
| 5,354,187 | 10/1994 | Holland et al. | 138/31 |
| 5,363,744 | 11/1994 | Pichler | 138/31 |
| 5,364,176 | 11/1994 | Sawada et al. | 303/116.1 |
| 5,365,736 | 11/1994 | Yamamoto | 138/31 |
| 5,466,055 | 11/1995 | Schmitt et al. | 303/113.1 |
| 5,472,266 | 12/1995 | Volz et al. | 303/116.1 |

FOREIGN PATENT DOCUMENTS

| | | | |
|---|---|---|---|
| 69569 | 5/1956 | France | 277/207 R |
| 3930557 | 3/1991 | Germany | 303/87 |
| 4301287 | 7/1994 | Germany | 303/116.4 |
| 2263753 | 8/1993 | United Kingdom . | |
| WO91/16221 | 10/1991 | WIPO . | |

*Primary Examiner*—Douglas C. Butler
*Attorney, Agent, or Firm*—Edwin E. Greigg; Ronald E. Greigg

[57] ABSTRACT

The invention sets forth a hydraulic housing block with a downward-opening cavity which is covered by a protective cap. For ventilation of the cavity, the protective cap is arranged with a clearance relative to the hydraulic housing block. The protective cap is arranged in such a way that spray and dirt can not penetrate into the cavity through a gap between the protective cap and the hydraulic housing block. In order to prevent this penetration, the cap seals off the cavity by at least one encircling sealing lip and provides an opening at the lowest point on the circumference of the sealing lip to allow ventilation of the cavity.

24 Claims, 1 Drawing Sheet

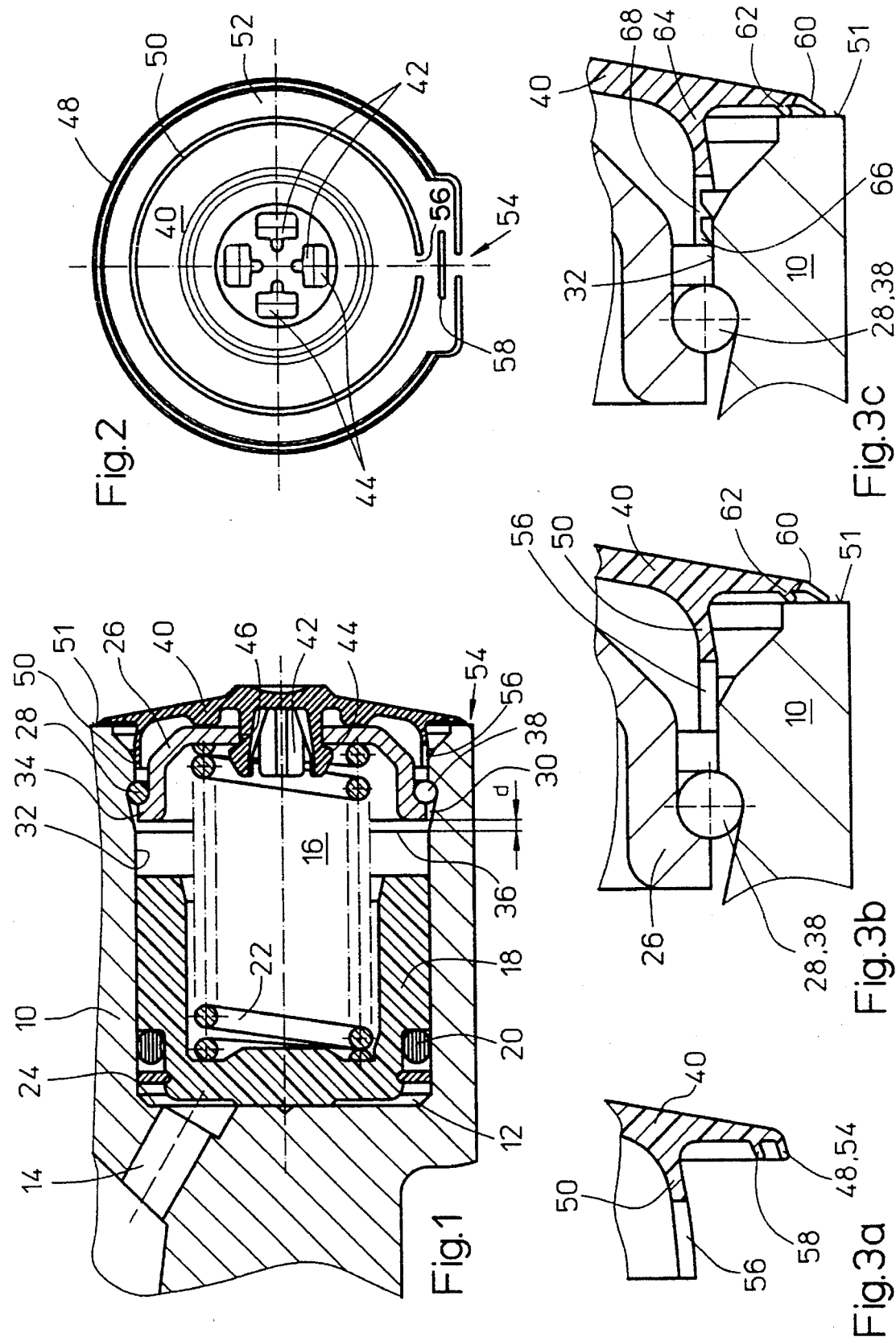

5,618,085

HYDRAULIC HOUSING BLOCK FOR HYDRAULIC BRAKE CONTROL OF VEHICLE BRAKES

PRIOR ART

The invention relates to a hydraulic housing block for an anti-lock and/or traction-controlled brake system for a motor vehicle.

A hydraulic housing block of this kind is known from GB 2 263 753 A. The known hydraulic housing block is provided with a pocket hole as a cylinder bore, in which a piston is arranged in a manner which allows it to be displaced in the axial direction, the said piston being pushed in the direction of the closed end of the pocket hole by a spring. The cylinder/piston arrangement forms an accumulator of variable volume for temporarily holding hydraulic fluid which emerges from a wheel-brake cylinder when the anti-lock or traction-control system responds, until it is pumped back to the brake master cylinder by a return pump.

The known hydraulic housing block is arranged in the vehicle in such a way that the pocket hole opens downwards. To prevent spray or dirt from getting into the pocket hole forming a cavity, the hole is covered with a protective cap. The protective cap has a ventilation opening which, in addition to its ventilating function, also serves the purpose of allowing any leakage fluid which escapes between the piston and the wall of the pocket hole to flow out of the pocket hole so that this fluid does not collect in the pocket hole on the rear side of the piston and does not hinder the movement of the piston. For the purpose of ventilation, the protective cap is provided with apertures in the end face facing a hydraulic housing block. The gap segments thereby formed between the hydraulic housing block and the protective cap form the ventilation openings of the protective cap.

The disadvantage of the known hydraulic housing block is that spray and dirt can penetrate between the protective cap and the housing block through the ventilation openings if the hydraulic housing block is rotated through 90° about a horizontal axis for installation into a vehicle and the axis of the pocket hole is thus horizontal. Spray that penetrates can lead to corrosion and dirt that penetrates leads to damage of the wall of the hole which forms a piston sliding surface when the piston moves.

ADVANTAGES OF THE INVENTION

In contrast, the hydraulic housing block according to the invention has the advantage that its protective cap prevents penetration of spray and dirt when the hydraulic housing block is arranged in such a way that the axis of the pocket hole is approximately horizontal. At the same time, the protective cap of the hydraulic housing block according to the invention ensures ventilation of the pocket hole closed by it and allows fluid to escape from the cavity.

The invention is not limited to a pocket hole which forms a cylinder bore. It can also be employed for other cavities of the hydraulic housing block which open in an approximately vertical outer surface of the hydraulic housing block and are to be ventilated.

Accordingly, there is positive engagement between the protective cap and the hydraulic housing block and this allows the protective cap to be fitted to the hydraulic housing block only in the intended position of the protective cap so that the opening is necessarily located at the lowest point of the opening.

A deflector web prevents the penetration of spray through the passage in the protective cap that forms the ventilation means.

BRIEF DESCRIPTION OF THE DRAWINGS

The invention is explained in greater detail below with reference to an exemplary embodiment which is illustrated in the drawing, in which:

FIG. 1 shows a partial view of part of a hydraulic block according to the invention;

FIG. 2 shows an inside view of the protective cap shown in FIG. 1; and

FIGS. 3a, 3b and 3c show various designs of sealing lips for the protective cap illustrated in FIG. 2.

DETAILED DESCRIPTION OF THE EXEMPLARY EMBODIMENT

FIG. 1 illustrates part of a hydraulic housing block 10 of an ABS (anti-lock system) and/or ASR (traction control) brake system for a motor vehicle. It shows an accumulator 12 for hydraulic fluid which is connected by a connecting hole 14 to a brake line (not shown) which leads from a wheel-brake cylinder (not shown) to the inlet side of a return pump (not shown).

The accumulator 12 has a blind hole 16 which forms a cylinder bore for a piston 18 that can be displaced axially in it. The piston 18 is sealed off with respect to the cylinder bore 16 by means of an O ring 20. It is pressed by a helical compression spring 22 towards an end face 24 of the cylinder bore 16 into which the connecting hole 14 opens. The hydraulic housing block 10 is arranged in such a way that the cylinder bore 16 is in a horizontal position.

Into the open end of the cylinder bore 16 is inserted a sheet-metal cap 26 against the inside of which the helical compression spring 22 is supported. The sheet-metal cap 26 is held by a resilient retaining ring 28 (circlip) which is open at one point on its circumference, is inserted into an encircling groove 30 in a cylinder bore wall 32 and behind the retaining ring the sheet-metal cap 26 engages by means of a flange 34 which projects radially outwards.

The width of the groove 30 is dimensioned such that there is an axial gap d between the sheet-metal cap 26 and the end 36 of the groove 30 further towards the inside of the bore. The retaining ring 28 is inserted in such a way into the groove 30 that its opening 38 is at the lowest point. Together with the axial gap d, this makes it possible for any fluid which may be in the cylinder bore 16 on the outside of the piston 18 to flow off.

The open end of the cylinder bore 16 is covered by a protective cap 40 made of a flexible material, for example plastic. The inside view of the protective cap 40 is shown in FIG. 2. It is of dish-shaped design with an outward curvature.

For the purpose of fastening the protective cap 40, it has four spring tongues 42, integral with it, which are arranged in the centre of the protective cap 40 and project inwards from the protective cap 40 at right angles, i.e. parallel to the axis of the cylinder bore 16. At their free ends, the spring tongues 42 have catch projections 44 which engage behind a central hole 46 in the sheet-metal cap 26.

To seal off the cylinder bore 16 against the penetration of dirt or spray, the protective cap 40 has two concentrically arranged encircling sealing lips 48, 50 which are integral with it. These two sealing lips 48, 50 project in the same direction as the spring tongues 42 from the protective cap 40. An outer sealing lip 48 of the two sealing lips 48, 50 rests in sealing fashion on an outer surface 51 of the hydraulic housing block 10. An inner sealing lip 50 of the two sealing lips 48, 50 projects into the cylinder bore 16, resting in sealing fashion on the cylinder bore wall 32. This double seal 48, 50 ensures that no dirt or spray can penetrate into the cylinder bore 16. Any spray which does get past the outer sealing lip 48 flows downwards into a drainage channel 52 formed between the two sealing lips 48, 50.

At the lowest point on their circumference, the two sealing lips 48, 50 are each provided with an opening 54, 56, these serving for the ventilation of the cylinder bore 16. As a safeguard against the penetration of spray or dirt through the openings 54, 56, the protective cap 40 has a deflector web 58, integral with it, which is arranged between the two sealing lips 48, 50 and covers both their openings 54, 56. Any spray which has penetrated into the drainage channel 52 flows out through the opening 54 in the outer sealing lip 48. Any fluid which there may be in the cylinder bore 16 on the outside of the piston 18 likewise flows out of the cylinder bore 16 through the groove 30 in the cylinder bore wall 32, the opening 38 in the retaining ring 28 and the two openings 54, 56 in the sealing lips 48, 50.

FIGS. 3a to 3c show possible embodiments of sealing lips for the protective cap 40 on an enlarged scale: FIG. 3a shows a cross section of the sealing lips 48, 50 with the openings 54, 56 and of the deflector web 58 of the protective cap 40 as shown in FIGS. 1 and 2.

In the case of the protective cap 40 illustrated in FIG. 3b, an outer sealing lip 60 and a deflector web 62 are formed projecting radially outwards at an oblique angle. A greater spring travel perpendicular to the outer surface 51 of the hydraulic housing block 10 on which the outer sealing lip 60 and the deflector web 62 rest is thereby achieved. In this way, the protective cap 40 can compensate for relatively large tolerances in the axial direction as regards the cylinder bore 16.

In the case of the embodiment of the protective cap 40 illustrated in FIG. 3c, the design of an inner sealing lip 64 is additionally modified in relation to the embodiment depicted in FIG. 3b: this sealing lip is provided with two encircling sealing lips 66 which project radially outwards and rest against the cylinder bore wall 32. Greater tolerance compensation is thereby achieved in the radial direction. As in the other embodiments, the inner sealing lip 64 has an opening 68 at the lowest point on its circumference.

The foregoing relates to preferred exemplary embodiments of the invention, it being understood that other variants and embodiments thereof are possible within the spirit and scope of the invention, the latter being defined by the appended claims.

We claim:

1. A hydraulic housing block which forms an accumulator for an ABS and/or ASR brake system which comprises an outward-opening cavity including a mouth which is situated in an approximately vertical outer surface (51) of said hydraulic housing block, a piston (18) in said cavity covers said mouth, a flexible protective cap, said flexible protective cap including encircling sealing lips, said encircling sealing lips including a ventilation means, the flexible protective cap (40) closes the cavity (16) in a leaktight fashion and each of said encircling sealing lips includes at least one passage (54, 56) therein which forms said ventilation means.

2. The hydraulic housing block as claimed in claim 1, wherein the protective cap (40) is mounted on the mouth of said hydraulic housing block 10 by means of a positive engagement, and said at least one passage (54, 56) is located at a lowest point of said protective cam.

3. The hydraulic housing block as claimed in claim 2, wherein the cavity (16) is a blind bore with an approximately horizontal axis.

4. The hydraulic housing block as claimed in claim 2, wherein the protective cap (40) has resilient catch projections (44) which engage behind undercuts formed on a metal cap within said mouth of the cavity (16).

5. The hydraulic housing block as claimed in claim 2, wherein the protective cap (40) has at least one encircling sealing lip (48, 50; 60; 64) which includes said at least one passage (54, 56).

6. The hydraulic housing block as claimed in claim 2, wherein the protective cap (40) has at least one encircling sealing lip (48, 50; 60; 64) with at least one opening (54, 56) at its lowest point.

7. The hydraulic housing block as claimed in claim 1, wherein the cavity (16) is a blind bore with an approximately horizontal axis.

8. The hydraulic housing block as claimed in claim 7, wherein the blind bore (16) is a cylinder bore of said accumulator (12) of variable volume for hydraulic fluid and said piston (18) is moved in an axial direction.

9. The hydraulic housing block as claimed in claim 8, wherein the protective cap (40) has resilient catch projections (44) which engage behind undercuts formed on a metal cap within said mouth of the cavity (16).

10. The hydraulic housing block as claimed in claim 8, wherein the protective cap (40) has at least one encircling sealing lip (48, 50; 60; 64) which includes said at least one passage (54, 56).

11. The hydraulic housing block as claimed in claim 8, wherein the protective cap (40) has two separate encircling sealing lips (48, 50; 60; 64) with said at least one opening (54, 56) at their lowest point.

12. The hydraulic housing block as claimed in claim 7, wherein the protective cap (40) has resilient catch projections (44) which engage behind undercuts formed on a metal cap within said mouth of the cavity (16).

13. The hydraulic housing block as claimed in claim 7, wherein the protective cap (40) has at least one encircling sealing lip (48, 50; 60; 64) which includes said at least one passage (54, 56).

14. The hydraulic housing block as claimed in claim 7, wherein the protective cap (40) has two separate encircling sealing lips (48, 50; 60; 64) with said at least one opening (54, 56) at their lowest point.

15. The hydraulic housing block as claimed in claim 1, wherein the protective cap (40) has resilient catch projections (44) which engage behind undercuts formed on a metal cap within said mouth of the cavity (16).

16. The hydraulic housing block as claimed in claim 15, wherein the protective cap (40) has at least one encircling sealing lip (48, 50; 60; 64) which includes said at least one passage (54, 56).

17. The hydraulic housing block as claimed in claim 15, wherein the protective cap (40) has two separate encircling sealing lips (48, 50; 60; 64) with said at least one opening (54, 56) at their lowest point.

18. The hydraulic housing block as claimed in claim 1, wherein the protective cap (40) has at least one encircling sealing lip (48, 50; 60; 64) which includes said at least one passage (54, 56).

19. The hydraulic housing block as claimed in claim 18, wherein the protective cap (40) has two separate encircling sealing lips (48, 50; 60; 64) with said at least one opening (54, 56) at their lowest point.

20. The hydraulic housing block as claimed in claim 1, wherein the protective cap (40) has at least one encircling sealing lip (48, 50; 60; 64) with at least one opening (54, 56) at its lowest point.

21. The hydraulic housing block as claimed in claim 1, wherein the protective cap (40) has a deflector web (58) which is arranged approximately parallel to and at a distance from a sealing lip (48, 50; 60; 64) and covers the at least one opening (54, 56).

22. The hydraulic housing block as claimed in claim 1, wherein an encircling groove (30) is provided in an inner wall of the cavity (16) and a resilient retaining ring (28) is inserted into said groove, and said retaining ring has an opening at one point on a circumference and the opening (38) faces downwards.

23. The hydraulic housing block as claimed in claim 22, wherein the retaining ring (28) is secured against rotation in the groove (30) by means of a positive engagement.

24. The hydraulic housing block as claimed in claim 1, wherein the protective cap (40) is composed of a flexible material.

\* \* \* \* \*